(12) United States Patent
Nakai et al.

(10) Patent No.: US 10,373,736 B2
(45) Date of Patent: Aug. 6, 2019

(54) CONDUCTIVE PATH

(71) Applicant: Sumitomo Wiring Systems, Ltd., Yokkaichi, Mie (JP)

(72) Inventors: Hirokazu Nakai, Mie (JP); Ryo Kuroishi, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 8 days.

(21) Appl. No.: 15/713,191

(22) Filed: Sep. 22, 2017

(65) Prior Publication Data

US 2018/0102203 A1    Apr. 12, 2018

(30) Foreign Application Priority Data

Oct. 11, 2016 (JP) .................................. 2016-199859

(51) Int. Cl.
| | |
|---|---|
| *H01R 4/00* | (2006.01) |
| *H01B 7/17* | (2006.01) |
| *H01B 1/02* | (2006.01) |
| *H01B 7/00* | (2006.01) |
| *H01B 7/02* | (2006.01) |
| *B60R 16/02* | (2006.01) |
| *H02G 15/18* | (2006.01) |

(52) U.S. Cl.
CPC ............ *H01B 7/17* (2013.01); *B60R 16/02* (2013.01); *H01B 1/023* (2013.01); *H01B 1/026* (2013.01); *H01B 7/0009* (2013.01); *H01B 7/02* (2013.01); *H02G 15/18* (2013.01)

(58) Field of Classification Search
USPC ............................................. 174/84 R, 88 R
See application file for complete search history.

(56) References Cited

U.S. PATENT DOCUMENTS

| | | | | |
|---|---|---|---|---|
| 1,953,891 | A * | 4/1934 | Andrew ................ | H01R 4/625 174/71 R |
| 2,535,397 | A * | 12/1950 | Alphonse .............. | B23K 11/20 219/106 |
| 8,047,420 | B2 * | 11/2011 | Stroh .................... | B23K 20/10 228/1.1 |
| 8,931,685 | B2 * | 1/2015 | Kataoka ................ | H01R 4/021 228/110.1 |

(Continued)

FOREIGN PATENT DOCUMENTS

| | | | | |
|---|---|---|---|---|
| JP | 2015-103457 A | * | 6/2015 | ............... H01B 7/00 |
| JP | 2016058137 A | | 4/2016 | |

*Primary Examiner* — William H. Mayo, III

(74) *Attorney, Agent, or Firm* — Reising Ethington, P.C.

(57) ABSTRACT

A single-core cable is protected over a long region by a pipe. A conductive path includes: a single-core cable in which end portions of a single-core wire are exposed; a first stranded cable in which an end portion of a first stranded wire that is exposed is coaxially fixed to the one end portion of the single-core wire; a second stranded cable in which an end portion of a second stranded wire that is exposed is coaxially fixed to the other end portion of the single-core wire; and a pipe that has an inner diameter dimension capable of surrounding the single-core cable and the first stranded cable, and is axially displaceable between a protective position at which only the single-core cable is surrounded, and an exposed position at which the one end portion of the single-core wire and the first stranded cable are surrounded, and the other end portion of the single-core wire is exposed.

6 Claims, 3 Drawing Sheets

(56) References Cited

U.S. PATENT DOCUMENTS

| | | | | |
|---|---|---|---|---|
| 9,207,130 | B2* | 12/2015 | Mori | G01K 13/02 |
| 2004/0088857 | A1* | 5/2004 | Fujimoto | H01R 11/12 |
| | | | | 29/871 |
| 2004/0134062 | A1* | 7/2004 | Jonli | H01R 4/021 |
| | | | | 29/872 |
| 2009/0218134 | A1* | 9/2009 | Stroh | H01R 4/021 |
| | | | | 174/74 R |
| 2012/0298645 | A1* | 11/2012 | Kleespiess | H01R 4/029 |
| | | | | 219/137 R |
| 2013/0110459 | A1* | 5/2013 | Kiryu | G01B 5/26 |
| | | | | 702/156 |
| 2016/0071630 | A1 | 3/2016 | Sugino | |
| 2016/0268019 | A1* | 9/2016 | Kanagawa | H02G 3/0468 |

\* cited by examiner

US 10,373,736 B2

CONDUCTIVE PATH

CROSS REFERENCE TO RELATED APPLICATIONS

This application claims the priority of Japanese patent application JP2016-199859 filed on Oct. 11, 2016, the entire contents of which are incorporated herein.

TECHNICAL FIELD

The present invention relates to a conductive path.

BACKGROUND ART

JP 2016-058137A discloses a vehicle conductive path in which a stranded cable is connected to opposite ends of a single-core cable. A single-core cable is hard to bend and deform because the conductor is formed of a single-core wire. However, the outer diameter of the single-core cable can be made smaller than that of each stranded cable if the electrical resistances are the same, and thus is routed in a low-height space such as underneath the floor of the vehicle body. The stranded cables have a larger outer diameter than the single-core cable because the conductors are formed of a stranded wire. However, the stranded cables can be easily bent and deformed, and thus are routed along a bent path within a narrow space such as inside the engine room and the vehicle interior rear space. At opposite end portions of the single-core cable, the single-core wire is exposed by removing an insulating covering. At an end portion of each stranded cable, the stranded wire is exposed by removing an insulating covering. Then, a stranded wire is coaxially fixed to each of the opposite end portions of the single-core wire using welding.

JP 2016-058137A is an example of related art.

SUMMARY

The single-core wire has low flexibility, and therefore, there is concern that the single-core wire may break when an external force acts thereon. As a countermeasure, it is conceivable to insert the single-core cable into a pipe having high rigidity so as to prevent the external force from directly acting on the single-core cable. However, of the opposite end portions of the single-core wire, a fixed region to which a stranded wire is fixed, as well as an excess length region for preventing interference with the equipment of a fixing device need to be exposed in order to weld the stranded wire to the single-core wire. Accordingly, the opposite end portions of the single-core wire cannot be surrounded by the pipe.

The present design has been completed in light of the above-described circumstances, and it is an object of the design to provide a conductive path capable of protecting a single-core cable over a long region with a pipe.

An aspect of the present design is directed to a conductive path including:
- a single-core cable having a configuration in which a single-core wire is surrounded by a single-core wire insulating covering, and one end portion and another end portion of the single-core wire are exposed by the single-core wire insulating covering being removed;
- a first stranded cable having a configuration in which a first stranded wire is surrounded by a first stranded wire insulating covering, and an end portion of the first stranded wire that is exposed by the first stranded wire insulating covering being removed is coaxially fixed to the one end portion of the single-core wire;
- a second stranded cable having a configuration in which a second stranded wire is surrounded by a second stranded wire insulating covering, and an end portion of the second stranded wire that is exposed by the second stranded wire insulating covering being removed is coaxially fixed to the other end portion of the single-core wire; and
- a pipe that has an inner diameter dimension capable of surrounding the single-core cable and the first stranded cable, and is axially displaceable between a protective position at which only the single-core cable is surrounded, and an exposed position at which the one end portion of the single-core wire and the first stranded cable are surrounded so as to expose the other end portion of the single-core wire.

To manufacture a conductive path according to the present design, the first stranded wire is first fixed to one end portion of the single-core wire, and the pipe is then moved to the exposed position so as to expose the other end portion of the single-core wire. In this state, the second stranded wire is fixed to the other end portion of the single-core wire, and thereafter, the pipe at the exposed position is moved to the protective position. Along with the movement of the pipe from the exposed position to the protective position, the region of the single-core cable that is surrounded by the pipe expands, thus making it possible to protect the single-core cable over a long region with the pipe.

EMBODIMENTS

According to an aspect of the present design, the single-core wire may be made of aluminum or an aluminum alloy, and the first stranded wire may be made of copper or a copper alloy. If the electrical resistances are the same, the outer diameter of the first stranded wire is larger than that of a single-core wire made of the same material. In view of this, copper or a copper alloy, which has a lower electrical resistivity than aluminum or an aluminum alloy constituting the material of the single-core wire, is used as the material of the first stranded wire. Consequently, the outer diameter of the first stranded cable is decreased, so that the outer diameter of the pipe can also be decreased, making it possible to decrease the height of the space necessary for routing the single-core cable.

According to an aspect of the present design, the one end portion of the single-core wire may include a first fixed region to which the first stranded wire is fixed, and a first exposed portion located between the first fixed region and the single-core wire insulating covering, the other end portion of the single-core wire may include a second fixed region to which the second stranded wire is fixed, and a second exposed portion located between the second fixed region and the single-core wire insulating covering, and, in a state in which the pipe is at the protective position, only the first fixed region and the second fixed region may be exposed to the outside of the pipe. With this configuration, the first stranded cable and the second stranded cable will not interfere with the end portions of the pipe when the first stranded cable and the second stranded cable are bent and routed.

Embodiment 1

Figure 1:
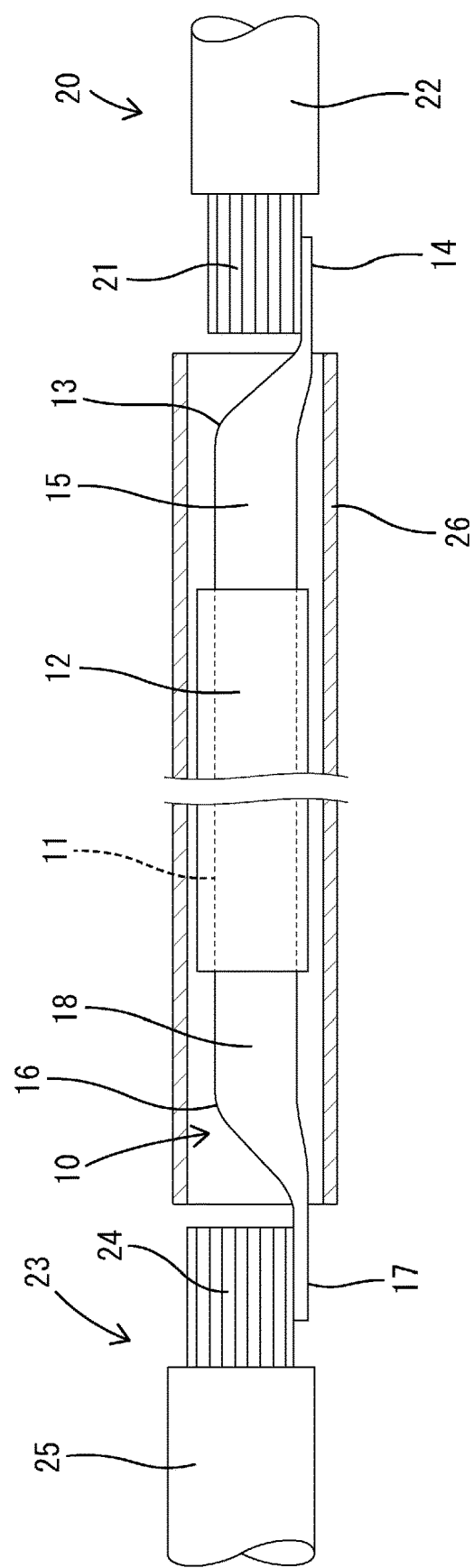
FIG. 1 is a partially cut-out side view of a conductive path according to Embodiment 1.

Hereinafter, Embodiment 1 of the present design will be described with reference to FIGS. 1 to 3. A conductive path according to Embodiment 1 includes one single-core cable 10, one first stranded cable 20, one second stranded cable 23, and one pipe 26.

The single-core cable 10 includes a cross-sectionally circular, single-core wire 11 made of aluminum or an aluminum alloy, and a cylindrical, single-core wire insulating covering 12 that surrounds the single-core wire 11, and the single-core cable 10 extends linearly. The single-core wire insulating covering 12 has been removed at one end portion of the single-core cable 10, and one end portion 13 of the single-core wire 11 is exposed over a certain length. The single-core wire 11 forming the single-core cable 10 is hard to bend and deform, but the outer diameter can be made smaller than that of the stranded wires if the electrical resistances are the same. Accordingly, the single-core cable 10 is routed in a low-height space such as underneath the floor of the vehicle body.

A distal end portion of the one end portion 13 that is exposed is shaped to be flat, and serves as a first fixed region 14 for conductively fixing a first stranded wire 21, which will be described later. A region of the one end portion 13 that is located between the first fixed region 14 and the single-core wire insulating covering 12 serves as a first exposed portion 15. The first exposed portion 15 is reserved for preventing an automated machine (not shown) for fixing the first fixed region 14 and the first stranded wire 21 to each other using ultrasonic welding from interfering with the single-core wire insulating covering 12.

At the other end portion of the single-core cable 10, the single-core wire insulating covering 12 has been removed, and the other end portion 16 of the single-core wire 11 is exposed over a certain length. A distal end portion of the other end portion 16 that is exposed is shaped to be flat, and serves as a second fixed region 17 for conductively fixing a second stranded wire 24, which will be described later. A region of the other end portion 16 that is located between the second fixed region 17 and the single-core wire insulating covering 12 serves as a second exposed portion 18. The second exposed portion 18 is reserved for preventing an automated machine (not shown) for fixing the second fixed region 17 and the second stranded wire 24 to each other using ultrasonic welding from interfering with the single-core wire insulating covering 12.

The first stranded cable 20 includes a cross-sectionally circular, first stranded wire 21 obtained by twisting together bare metal element wires made of copper or a copper alloy, and a cylindrical, first stranded wire insulating covering 22 that surrounds the first stranded wire 21. The first stranded cable 20 can be relatively easily deformed such that its axis is bent or curved, and thus is routed along a path that is bent within a narrow space such as inside the engine room or the vehicle interior rear space. At an end portion of the first stranded cable 20 that is located on the single-core cable 10 side, the first stranded wire insulating covering 22 has been removed, and an end portion of the first stranded wire 21 is exposed over a range that is slightly longer than the first fixed region 14.

The end portion of the first stranded wire 21 is conductively and coaxially fixed to the first fixed region 14 of the single-core wire 11 using ultrasonic welding. The fixed portion between the second fixed region 17 and the second stranded wire 24 is surrounded in a liquid-tight manner by waterproofing means (not shown) such as a heat-shrinkable tube. The end portions of the single-core cable 10 and the first stranded cable 20 are substantially coaxially connected in the form of a straight line. Copper or a copper alloy constituting the material of the first stranded wire 21 has lower electrical resistivity than aluminum or an aluminum alloy constituting the material of the single-core wire 11. Accordingly, the outer diameter of the first stranded wire 21 has substantially the same dimension as that of the outer diameter of the single-core wire 11, or has a dimension that is not significantly different from that of the outer diameter of the single-core wire 11. Therefore, the outer diameter of the first stranded cable 20 has substantially the same dimension as that of the outer diameter of the single-core cable 10, or a dimension that is not significantly different from that of the outer diameter of the single-core cable 10.

The second stranded cable 23 includes a cross-sectionally circular, second stranded wire 24 obtained by twisting together bare metal element wires made of aluminum or an aluminum alloy as with the single-core wire 11, and a cylindrical, second stranded wire insulating covering 25 that surrounds the second stranded wire 24. The second stranded cable 23 can be relatively easily deformed such that its axis is bent or curved, and thus is routed along a path that is bent within a narrow space such as inside the engine room or the vehicle interior rear space. At an end portion of the second stranded cable 23 that is located on the single-core cable 10 side, the second stranded wire insulating covering 25 has been removed, and an end portion of the second stranded wire 24 is exposed over a range that is slightly longer than the second fixed region 17.

The end portion of the second stranded wire 24 is conductively and coaxially fixed to the second fixed region 17 of the single-core wire 11 using ultrasonic welding. The fixed portion between the second fixed region 17 and the second stranded wire 24 is surrounded in a liquid-tight manner by waterproofing means (not shown) such as a heat-shrinkable tube. The end portions of the single-core cable 10 and the second stranded cable 23 are substantially coaxially connected in the form of a straight line. Since the material of the second stranded wire 24 is the same as the material of the single-core wire 11, the outer diameter of the second stranded wire 24 is larger than the outer diameter of the single-core wire 11. Therefore, the outer diameter of the second stranded cable 23 is larger than the outer diameter of the single-core cable 10.

The pipe 26 is a linear cylindrical component that is made of a material having higher flexural rigidity than the single-core wire 11, such as a metal. The inner diameter of the pipe 26 has a dimension that allows it to surround the single-core cable 10, the first fixed region 14, and the first stranded cable 20, and also has a dimension smaller than that of the outer diameter of the second stranded cable 23. The length of the pipe 26 has a dimension that is equivalent to that of the length from the boundary between the first fixed region 14 and the first exposed portion 15 to the boundary between the second fixed region 17 and the second exposed portion 18.

The pipe 26 can be axially moved in a state of surrounding at least a part of the single-core cable 10. That is, the pipe 26 is movable between the protective position (see FIG. 1) at which only the single-core cable 10 is surrounded and the exposed position (see FIG. 3) at which a part of the single-core cable 10, the whole of one end portion 13 of the single-core wire 11, and a part of the first stranded cable 20 are surrounded. In a state in which the pipe 26 is at the exposed position, the whole of the other end portion 16 of the single-core wire 11 is exposed.

Figure 2:
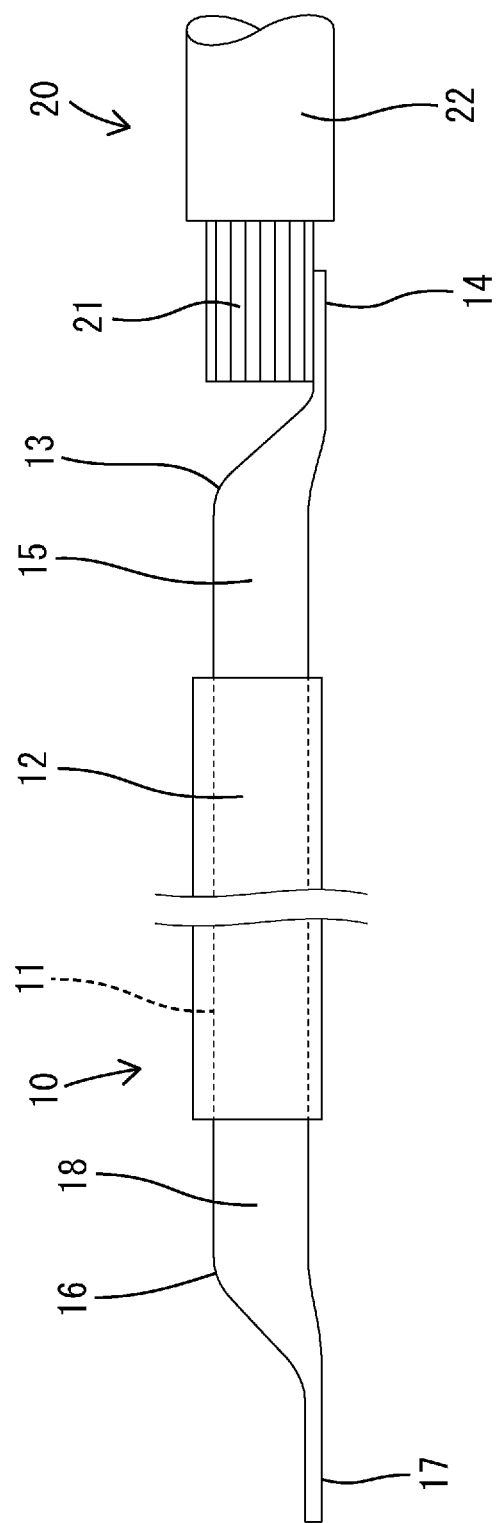
FIG. 2 is a partially cut-out side view showing a state immediately after a single-core wire and a first stranded wire are fixed to each other.
Figure 3:
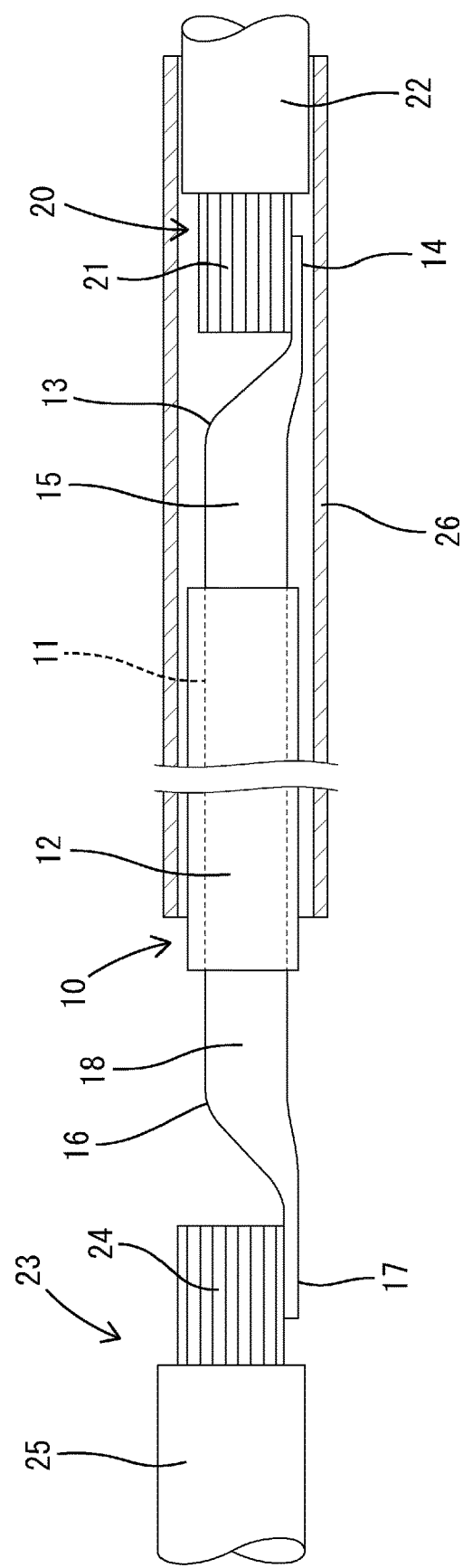
FIG. 3 is a partially cut-out side view showing a state immediately after a single-core wire and a second stranded wire are fixed to each other.

When manufacturing the conductive path, the first stranded wire 21 is first fixed to one end portion 13 (the first fixed region 14) of the single-core wire 11 in a state in which the pipe 26 is removed from the single-core cable 10 and the first stranded cable 20, as shown in FIG. 2. Then, as shown in FIG. 3, the pipe 26 is moved to the exposed position so as to expose the other end portion 16 of the single-core wire 11. In this state, the second stranded wire 24 is fixed to the other end portion 16 (the second fixed region 17) of the single-core wire 11. By subsequently moving the pipe 26 at the exposed position to the protective position, the manufacturing of the conductive path is complete.

When fixing the second stranded wire 24 to the single-core wire 11, the pipe 26 is retracted to the first fixed region 14 side (the exposed position) where the first stranded wire 21 has already been fixed. Then, after the second stranded wire 24 has been fixed to the single-core wire 11, the pipe 26 is moved from the exposed position to the protective position. The pipe 26 at the exposed position is retracted to a position at which a part of the first stranded cable 20 is surrounded, so that a sufficiently larger retraction amount can be ensured than when only the single-core wire 11 is surrounded.

The region of the single-core cable 10 that is surrounded by the pipe 26 expands when the pipe 26 is moved from the exposed position to the protective position. In the present embodiment, however, the retracted dimension of the pipe 26 when the pipe 26 is retracted to the exposed position is large, thus allowing the single-core cable 10 to be protected by being surrounded by the pipe 26 over a long region when the pipe 26 is moved to the protective position.

The single-core wire 11 is made of aluminum or an aluminum alloy, and the first stranded wire 21 is made of copper or a copper alloy. The technical significance of this material selection is as follows. Since the cross-sectional areas of conductors that are connected in series to form one conductive path are set to have the same electrical resistance, the outer diameter of the first stranded wire 21 is larger than that of the single-core wire 11 made of the same material. In view of this, copper or a copper alloy, which has a smaller electrical resistivity than aluminum or an aluminum alloy constituting the material of the single-core wire 11, is selected as the material of the first stranded wire 21. Consequently, the outer diameter of the first stranded cable 20 is decreased, so that the outer diameter of the pipe 26 can also be decreased, thus making it possible to reduce the height of the space necessary for routing the single-core cable 10.

One end portion 13 of the single-core wire 11 is exposed so as to include the first fixed region 14 to which the first stranded wire 21 is fixed, and the first exposed portion 15 located between the first fixed region 14 and the single-core wire insulating covering 12. The other end portion 16 of the single-core wire 11 is exposed so as to include the second fixed region 17 to which the second stranded wire 24 is fixed, and the second exposed portion 18 located between the second fixed region 17 and the single-core wire insulating covering 12. Then, in a state in which the pipe 26 is at the protective position, only the first fixed region 14 and the second fixed region 17 are exposed to the outside of the pipe 26, and the first exposed portion 15 and the second exposed portion 18 are surrounded by the pipe 26. With this configuration, when the first stranded cable 20 and the second stranded cable 23 are bent and routed, the first stranded cable 20 and the second stranded cable 23 will not interfere with the end portions of the pipe 26.

Other Embodiments

The present invention is not limited to the embodiment described by the above statements and drawings, and, for example, the following embodiments also fall within the technical scope of the present invention.

In the above-described embodiment, the material of the first stranded wire is copper or a copper alloy. However, the material of the first stranded wire may be aluminum or an aluminum alloy as with the single-core wire and the second stranded wire.

In the above-described embodiment, the single-core wire and the second stranded wire are made of the same material, and the first stranded wire is made of material different from that of the single-core wire and the second stranded wire. However, the single-core wire, the first stranded wire, and the second stranded wire may be all made of the same material. Alternatively, only the single-core wire and the first stranded wire may be made of the same material, or only the first stranded wire and the second stranded wire may be made of the same material.

In the above-described embodiment, only the first fixed region and the second fixed region are exposed to the outside of the pipe in a state in which the pipe is at the protective position. However, in a state in which the pipe is at the protective position, only one of the first fixed region and the second fixed region may be exposed to the outside of the pipe, or both the first fixed region and the second fixed region (i.e., the entire length of the single-core cable) may be surrounded by the pipe.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Single-core cable
11 Single-core wire

12 Single-core wire insulating covering
13 One end portion
14 First fixed region
15 First exposed portion
16 Other end portion
17 Second fixed region
18 Second exposed portion
20 First stranded cable
21 First stranded wire
22 First stranded wire insulating covering
23 Second stranded cable
24 Second stranded wire
25 Second stranded wire insulating covering
26 Pipe

What is claimed is:

1. A conductive path comprising:
   a single-core cable having a configuration in which a single-core wire is surrounded by a single-core wire insulating covering, and one end portion and another end portion of the single-core wire are exposed by the single-core wire insulating covering being removed;
   a first stranded cable having a configuration in which a first stranded wire is surrounded by a first stranded wire insulating covering, and an end portion of the first stranded wire that is exposed by the first stranded wire insulating covering being removed is coaxially fixed to the one end portion of the single-core wire at a first fixed region;
   a second stranded cable having a configuration in which a second stranded wire is surrounded by a second stranded wire insulating covering, and an end portion of the second stranded wire that is exposed by the second stranded wire insulating covering being removed is coaxially fixed to the other end portion of the single-core wire at a second fixed region; and
   a metal pipe that has an inner diameter dimension capable of surrounding the single-core cable and the first stranded cable, and is axially displaceable between a protective position at which only the single-core cable is surrounded while the first fixed region and the second fixed region are exposed, and an exposed position at which the one end portion of the single-core wire and the first stranded cable are surrounded so as to expose the other end portion of the single-core wire.

2. The conductive path according to claim 1, wherein the single-core wire is made of aluminum or an aluminum alloy, and the first stranded wire is made of copper or a copper alloy.

3. The conductive path according to claim 1, wherein
   the one end portion of the single-core wire includes the first fixed region to which the first stranded wire is fixed, and a first exposed portion located between the first fixed region and the single-core wire insulating covering,
   the other end portion of the single-core wire includes the second fixed region to which the second stranded wire is fixed, and a second exposed portion located between the second fixed region and the single-core wire insulating covering, and,
   in a state in which the metal pipe is at the protective position, only the first fixed region and the second fixed region are exposed to the outside of the metal pipe.

4. The conductive path according to claim 1, wherein the metal pipe comprises a fixed shape.

5. The conductive path according to claim 1, wherein the metal pipe comprises a fixed diameter.

6. The conductive path according to claim 1, wherein the metal pipe comprises a fixed length.

* * * * *